United States Patent
Biyikli et al.

(10) Patent No.: US 7,085,450 B2
(45) Date of Patent: Aug. 1, 2006

(54) FABRICATION OF STRUCTURES IN AN OPTICAL SUBSTRATE

(75) Inventors: Levent Biyikli, Cedar Park, TX (US);
Jerome C. Porque, Austin, TX (US);
James M. Battiato, Austin, TX (US);
David B. Stegall, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/020,894

(22) Filed: Dec. 22, 2004

(65) Prior Publication Data
US 2006/0133728 A1    Jun. 22, 2006

(51) Int. Cl.
*G02B 6/34* (2006.01)
*G03C 5/00* (2006.01)
*C03B 37/022* (2006.01)
*C03B 37/023* (2006.01)
*C03B 37/018* (2006.01)

(52) U.S. Cl. .................. 385/37; 430/321; 65/385; 65/386; 65/392

(58) Field of Classification Search ............... 385/37; 430/321; 65/385–386, 392, 402
See application file for complete search history.

(56) References Cited

U.S. PATENT DOCUMENTS

| | | | |
|---|---|---|---|
| 5,912,999 A | 6/1999 | Brennan, III et al. | |
| 5,945,261 A | 8/1999 | Rourke | |
| 6,072,926 A | 6/2000 | Cole et al. | |
| 6,384,977 B1 | 5/2002 | Laming et al. | |
| 6,434,300 B1 | 8/2002 | Hammon et al. | |
| 6,437,886 B1* | 8/2002 | Trepanier et al. | 359/35 |
| 6,606,159 B1* | 8/2003 | Hill | 356/491 |
| 6,754,162 B1* | 6/2004 | Fujita et al. | 369/112.05 |
| 6,836,592 B1* | 12/2004 | Mead et al. | 385/37 |
| 6,882,477 B1* | 4/2005 | Schattenburg et al. | 359/577 |
| 6,904,201 B1* | 6/2005 | St. Hilaire et al. | 385/37 |
| 6,915,044 B1* | 7/2005 | Matthews | 385/37 |
| 2001/0046037 A1* | 11/2001 | Ota et al. | 355/53 |

FOREIGN PATENT DOCUMENTS

| EP | 1 378 770 A1 | 1/2004 |
|---|---|---|
| WO | WO 02/071114 A1 | 9/2002 |

OTHER PUBLICATIONS

Malo, B., et al; "Effective Index Drift from Molecular Hydrogen Diffusion in Hydrogen-Loaded Optical Fibres and its Effect on Bragg Grating Fabrication", *Electronics Letters* (Mar. 3, 1994); vol. 30, No. 5; pp. 442-444.

(Continued)

Primary Examiner—Brian Healy
Assistant Examiner—Charlie Peng
(74) Attorney, Agent, or Firm—Gregg H. Rosenblatt

(57) ABSTRACT

A system and method for fabricating structures in an optical substrate. An optical element produces first and second write beams that intersect at a first intersection location at the optical substrate. The first intersection location includes a fringe pattern produced by the first and second write beams. The optical element also produces first and second reference beams that intersect and are recombined at a second intersection location in substantially the same plane as the first intersection location. A controller then controls relative positioning between the optical substrate and the fringe pattern based on a signal derived from the recombined first and second reference beams.

20 Claims, 9 Drawing Sheets

OTHER PUBLICATIONS

Martin, J. & Ouellette, F.; "Novel Writing Technique of Long and Highly Reflective In-Fibre Gratings", *Electronics Letters* (May 12, 1994); vol. 30, No. 10, pp. 811-812.

Stubbe, R., et al; "Novel Technique for Writing Long Superstructured Fiber Bragg Gratings", *Photosensitivity and Quadratic Nonlinearity in Glass Waveguides: Fundamentals and Applications*, (Sep. 9-11, 1995); OSA 1995 Technical Digest Series, Postdeadline Papers; vol. 22; pp. 285-287.

Kashyap, R., et al; "Simple Technique for Apodising Chirped and Unchirped Fibre Bragg Gratings"; *Electronics Letters* (Jun. 20, 1996); vol. 32, No. 13; pp. 1226-1228.

Asseh, A., et al; "A Writing Technique for Long Fiber Bragg Gratings with Complex Reflectivity Profiles", *Journal of Lightware Technology* (Aug. 1997); vol. 15, No. 8; pp. 1419-1423.

Bakhti, F., et al; "Impact of Hydrogen in-Fiber and out-Fiber Diffusion on Central Wavelength of UV-Written Long Period Grating", *Conference: Bragg Grating, Photosensitivity, and Poling in Glass Fibers and Waveguides: Applications and Fundamentals* (Oct. 26-28, 1997); OSA 1997 Technical Digest, Postconference Ed.; pp. 55-57.

Canning, J.; "Photosensitization and Photostabilization of Laser-Induced Index Changes in Optical Fibers", *Optical Fiber Technology*(2000); vol. 6; pp. 275-289.

Petermann, I. et al; "Fabrication of Advanced Fiber Bragg Gratings by Use of Sequential Writing with a Continuous-Wave Ultraviolet Laser Source", *Applied Optics* (Feb. 20, 2002); vol. 41, No. 6; pp. 1051-1056.

Kashyap, R., et al; "Replication of Phase-Shifted DFB Grating Structures in Photosensitive Germania and Rare-Earth-Doped Optical Fibres", *IEE Colloquium on Optical Fibre Gratings and Their Applications* (Jan. 30, 1995); IEE, London, GB; No. 1995/17; pp. 6-1-- 6-5.

Froggatt, M., et al; "Visualization of Fringes in Holographic Apparatus for Fiber Bragg Grating Fabrication Using a Phase Mask", *Optical Fiber Communication Conference, Technical Digest Postconference Ed.* (Mar. 7-10, 2000); IEEE, US; vol. 2 of 4; pp. WB6-1 -- WB6-3.

Chuang, K-P, et al; "Interferometric Side-Diffraction Position Monitoring Technique for Writing Long Fiber Bragg Gratings", *Conference on Lasers and Electro-Optics 2004* (May 16, 2004); CLEO, Piscataway, NJ; vol. 2; pp. 2-3.

* cited by examiner

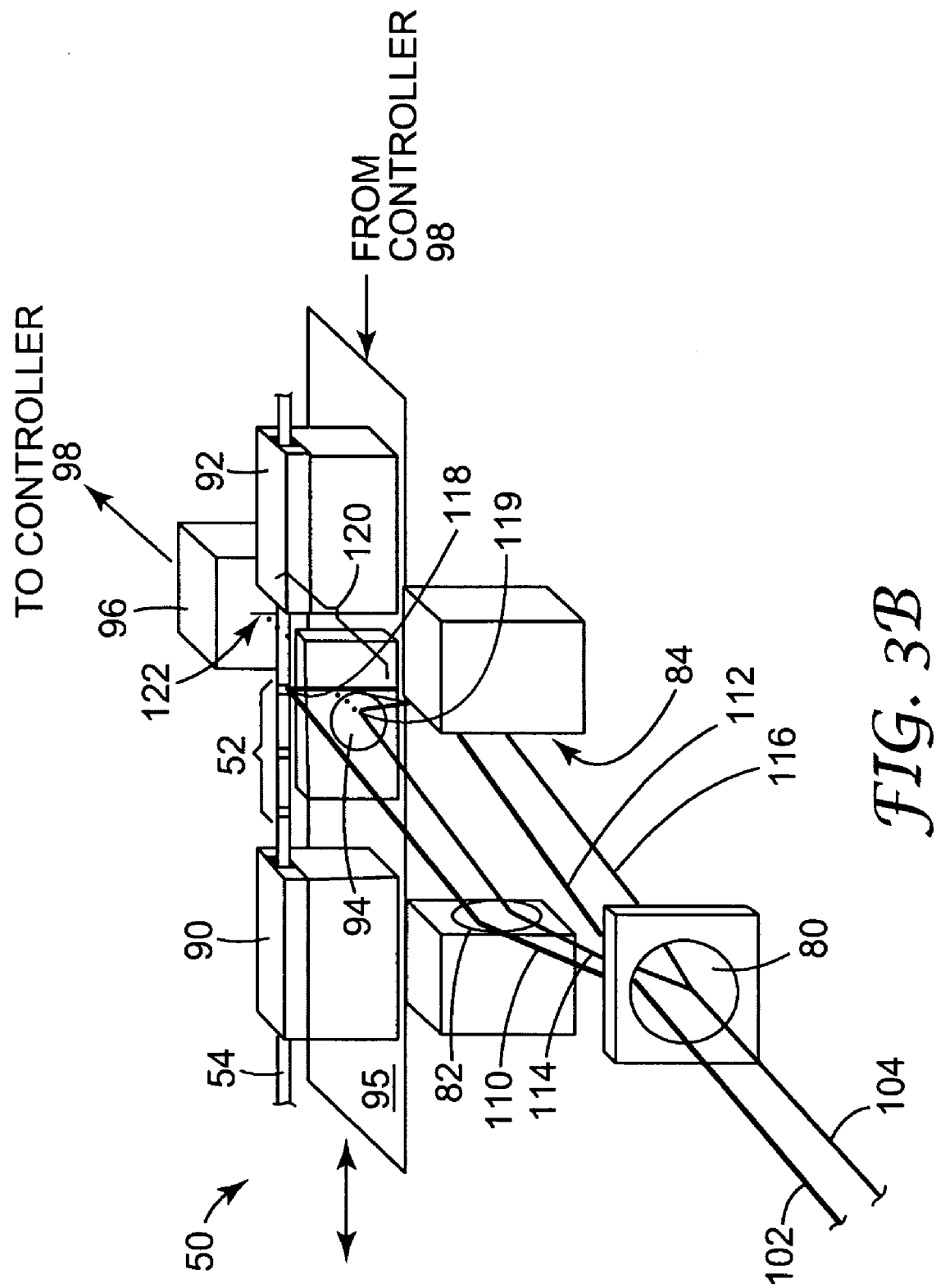

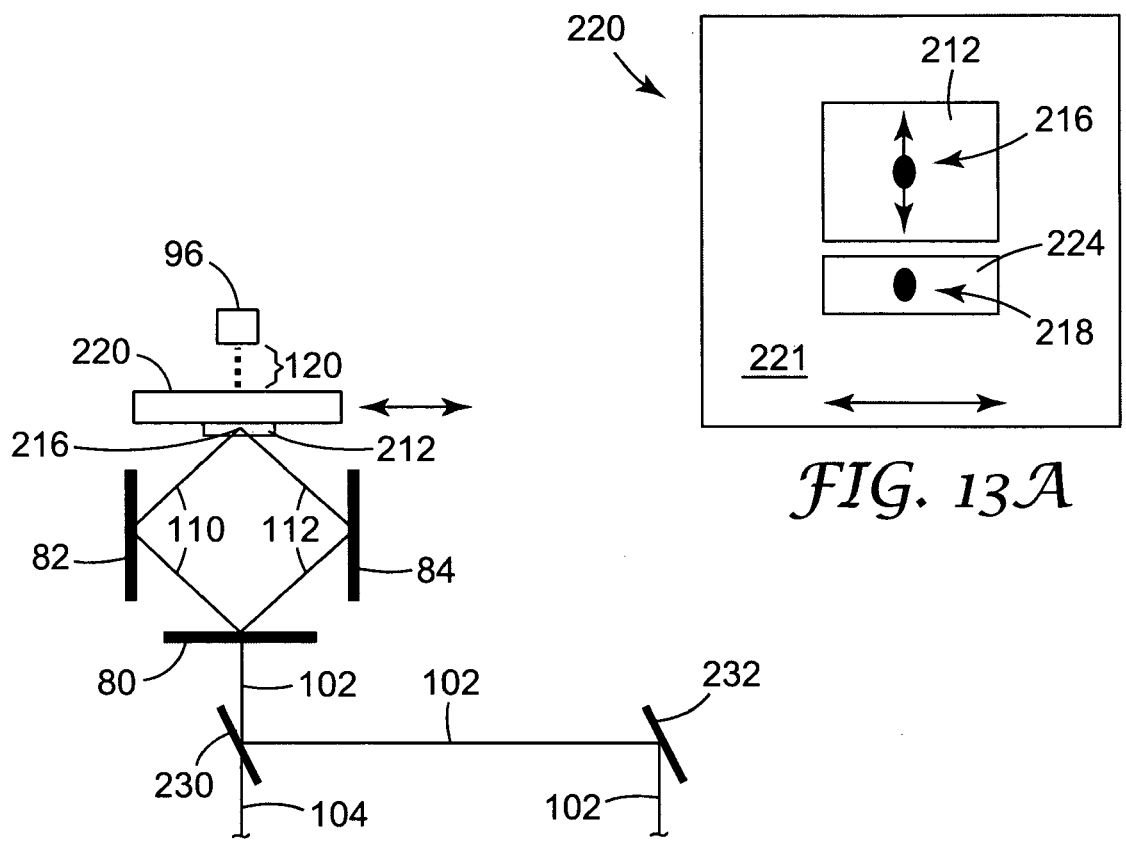
FIG. 13A
FIG. 13B
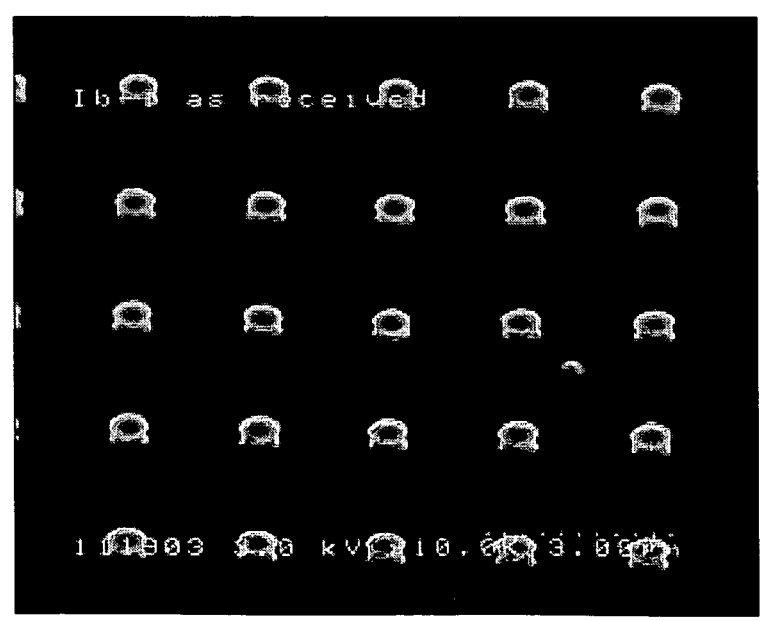
FIG. 14

FABRICATION OF STRUCTURES IN AN OPTICAL SUBSTRATE

BACKGROUND OF THE INVENTION

The present invention relates generally to optical systems. More specifically, the present invention relates to a system for the fabrication of periodic or aperiodic structures in an optical substrate.

Optical fibers are long, thin strands of very pure glass which are used to transmit light signals over long distances. Each optical fiber typically has three parts: a core, a cladding, and a buffer coating. The core is the thin glass center of the fiber where the light travels. The cladding is the outer optical material surrounding the core that reflects the light back into the core because it has an index of refraction less than that of the inner core. The buffer coating is a polymer coating that protects the fiber from damage and moisture. Large numbers of these optical fibers can be arranged in bundles to form optical cables.

A fiber grating is a periodic or aperiodic perturbation of the effective absorption coefficient and/or the effective refractive index of an optical waveguide. It can reflect a predetermined range of wavelengths of light incident on the grating, while passing all other non-resonant wavelengths of light. Fiber gratings are useful as, for example, filters for wavelength division multiplexing (WDM), gain flattening filters for optical amplifiers, and stabilizers for laser diodes used to pump optical amplifiers.

Typically, fiber gratings are made by laterally exposing the core of a single-mode fiber to a periodic pattern of intense actinic radiation (e.g., ultraviolet light). The exposure produces a permanent increase in the refractive index of the fiber's core, creating a fixed index modulation according to the exposure pattern. This fixed index modulation is called a grating. At each periodic refraction change, a small amount of light is reflected. All the reflected light signals combine coherently to one large reflection at a particular wavelength when the grating period is approximately half the input light's wavelength. This is referred to as the Bragg condition, and the wavelength at which this reflection occurs is called the Bragg wavelength.

In order to laterally expose the core of a fiber to form a grating, the fiber is typically moved relative to the light source (or vice versa). A challenge in the fabrication of gratings is to minimize positional errors between the multiple exposures in a grating caused by the relative movement between the fiber and the light source. Positional errors can result in phase errors between the multiple segments that form the grating. One approach to addressing this issue involves moving the fiber at a constant speed on a rotary stage while simultaneously modulating the write beams with a time-dependent function generator. This approach requires the rotary stage to maintain a constant angular velocity from which the rotary stage position is inferred. However, if the rotary stage is not maintained at a constant angular velocity, positional and phase errors are likely to occur.

A second approach involves carrying the fiber on a linear stage and stopping and exposing the fiber at various predetermined fixed locations along the fiber to stitch together a grating. While the stage carrying the fiber need not maintain a constant velocity with this approach, the stitching together of grating sections must be accomplished with an extremely high positional accuracy. Failure to maintain this accuracy also results in positional and phase errors in the fabrication process.

A third approach is a combination of the first two approaches and involves accurately knowing the position of the stage carrying the fiber as it moves the fiber with respect to an optical interference pattern. The stage position is read and the write beams are modulated according to the measured position. In this approach, a constant velocity is maintained by the stage, and the position of the stage must be constantly known to high accuracy. However, this approach only addresses errors due to fluctuations in the velocity of the stage carrying the fiber. Other perturbations common in a manufacturing environment, such as interference fringe drift or movement, vibrations of optical mounts, wavelength fluctuations, fluctuations of the write beam position, non-linearity of fiber photosensitivity, and so on, cause equivalent position or velocity errors but remain undetected and uncorrected. These other sources of error can increase the overall error in the system by an order of magnitude or more.

Thus, there is a need for a system that addresses these and other sources of error in the fabrication of structures in an optical substrate.

BRIEF SUMMARY OF THE INVENTION

The present invention is a system and method for fabricating structures in an optical substrate. An optical element produces first and second write beams that intersect at a first intersection location at the optical substrate. The first intersection location includes a fringe pattern produced by the first and second write beams. The optical element also produces first and second reference beams that intersect and are recombined at a second intersection location in substantially the same plane as the first intersection location. A controller then controls relative positioning between the optical substrate and the fringe pattern based on a signal derived from the recombined first and second reference beams.

In one embodiment, the controller includes a beam combiner positioned at the second intersection location for recombining the first and second reference beams into an encoded beam. The controller additionally includes a detector to produce a detector signal based on the encoded beam. The controller also includes a processor to determine position information about the optical substrate based on the detector signal. The controller further includes a device for positioning the optical substrate based on the position information about the optical substrate.

BRIEF DESCRIPTION OF THE DRAWINGS

FIG. 3B is a perspective view of a portion of the system shown in FIG. 3A.

FIG. 13A is a plan view of another positioning stage for fabricating structures in a two-dimensional substrate according to the present invention.

FIG. 13B is a top view of a portion of a system including the positioning stage of FIG. 13A for fabricating structures in a two-dimensional substrate.

FIG. 14 is a photograph showing a two-dimensional grating formed using the system shown in FIGS. 13A and 13B.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

Figure 1:
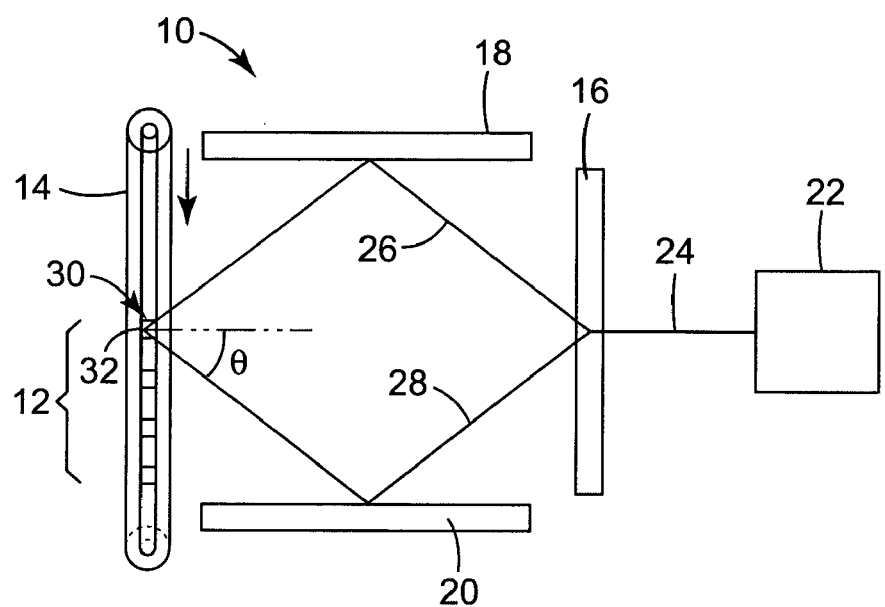
FIG. 1 is a top view of a conventional interferometer for creating structures in an optical substrate.

FIG. 1 is a top view of a conventional interferometer 10 for creating interference patterns 12 in an optical substrate 14 (for example, an optical waveguide such as an optical fiber). Interferometer 10 includes beam splitter 16 and reflectors 18 and 20. Light source 22, which is typically a source of actinic radiation such as a laser, provides input beam 24 to interferometer 10. Interferometer 10 is commonly referred to as a Talbot interferometer.

In a typical Talbot interferometer, beam splitter 16 splits input beam 24 into two writing beams, first write beam 26 and second write beam 28. Typically, input beam 24 is split such that half of input beam 24 is transmitted from beam splitter 16 as first write beam 26 and half of input beam 24 is transmitted from beam splitter 16 as second write beam 28. First write beam 26 is directed to optical substrate 14 by reflector 18, and second write beam 28 is directed to optical substrate 14 by reflector 20. The angle of incidence of first write beam 26 and second write beam 28 on optical substrate 14 is based on the point and angle of incidence of first write beam 26 on reflector 18 and of second write beam 28 on reflector 20. First write beam 26 and second write beam 28 are reflected from reflectors 18 and 20, respectively, toward optical substrate 14 at an inter-beam half angle, O. First write beam 26 and second write beam 28 intersect at intersection plane 30 and interfere with each other at region 32 in optical substrate 14. The exposure produces a permanent increase in the refractive index of optical substrate 14, creating structure 12 (commonly referred to as a grating in an optical fiber core) according to the exposure pattern. The period of a structure formed by an interferometer can be described by the well-known Bragg equation $$2n\Lambda_B \sin\theta = m\lambda \qquad \text{(Eq. 1)},$$

where $\Lambda_B$ is the period, $\theta$ is the half-angle between the write beams, $\lambda$ is the wavelength of the write beams used to form structure 12, m is an integer representing the diffraction order, and n is the index of refraction.

To form structure 12 in optical substrate 14, optical substrate 14 must be moved relative to intersection plane 30 (or vice versa). A challenge in the fabrication of structure 12 is to minimize phase or positional errors between the multiple exposures caused by the relative movement between optical substrate 14 and intersection plane 30. Various approaches to addressing this challenge have been developed, such as maintaining a constant velocity with the optical substrate 14 relative to intersection plane 30, or stopping and exposing optical substrate 14 at various predetermined fixed locations along to stitch together structure 12. However, phase or positional errors are likely to occur with these two approaches, as they require extremely precise control of the velocity and position, respectively, of optical substrate 14. A third approach to addressing the issue of phase and positional errors involves accurately knowing the position of the stage carrying optical substrate 14 as it moves optical substrate 14 with respect to intersection plane 30. The stage position is read and write beams 26 and 28 are modulated according to the measured position. This approach addresses the drawbacks of the first two approaches in that even if optical substrate 14 is not maintained at a constant velocity, the position of optical substrate 14 is constantly known. However, this approach only addresses errors due to fluctuations in the velocity of the stage carrying optical substrate 14. Other perturbations common in a manufacturing environment, such as interference fringe drift or movement, vibrations of optical mounts, wavelength fluctuations, fluctuations of the write beam position, and so on, cause equivalent position or velocity errors but remain undetected and uncorrected.

Figure 2:
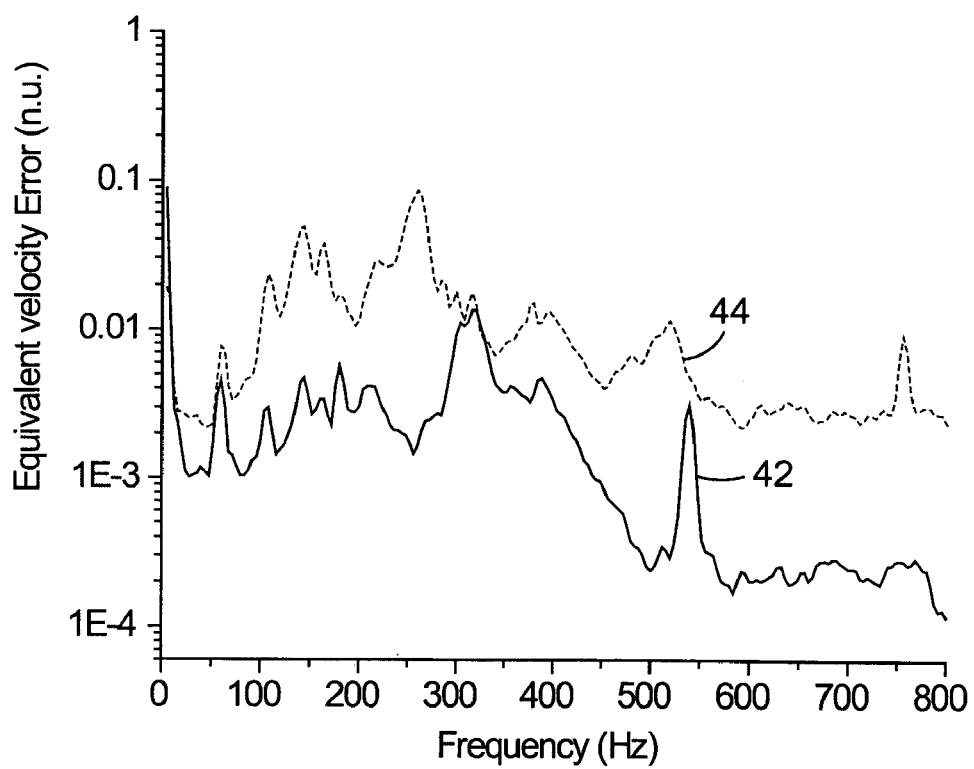
FIG. 2 is a line graph showing velocity errors that occur when creating structures in an optical substrate in a conventional fabrication system.

FIG. 2 is a line graph showing the frequency spectrum of velocity errors that occur when creating interference patterns in a conventional optical fabrication system employing the third approach described above. Line 42 shows the magnitude of error due to velocity fluctuations from the stage carrying optical substrate 14. This error compares the actual velocity of the stage to the desired velocity of the stage and is measured using an accelerometer. Line 44 shows the magnitude of errors caused by extraneous noise sources in a manufacturing environment (such as those listed above) in addition to errors due to velocity fluctuations from the stage carrying the optical substrate 14. This error compares the actual velocity of the stage to the desired velocity of the stage. As can be seen, the extraneous noise sources increase the total error of the system by an order of magnitude or more at certain frequencies.

Figure 3A:
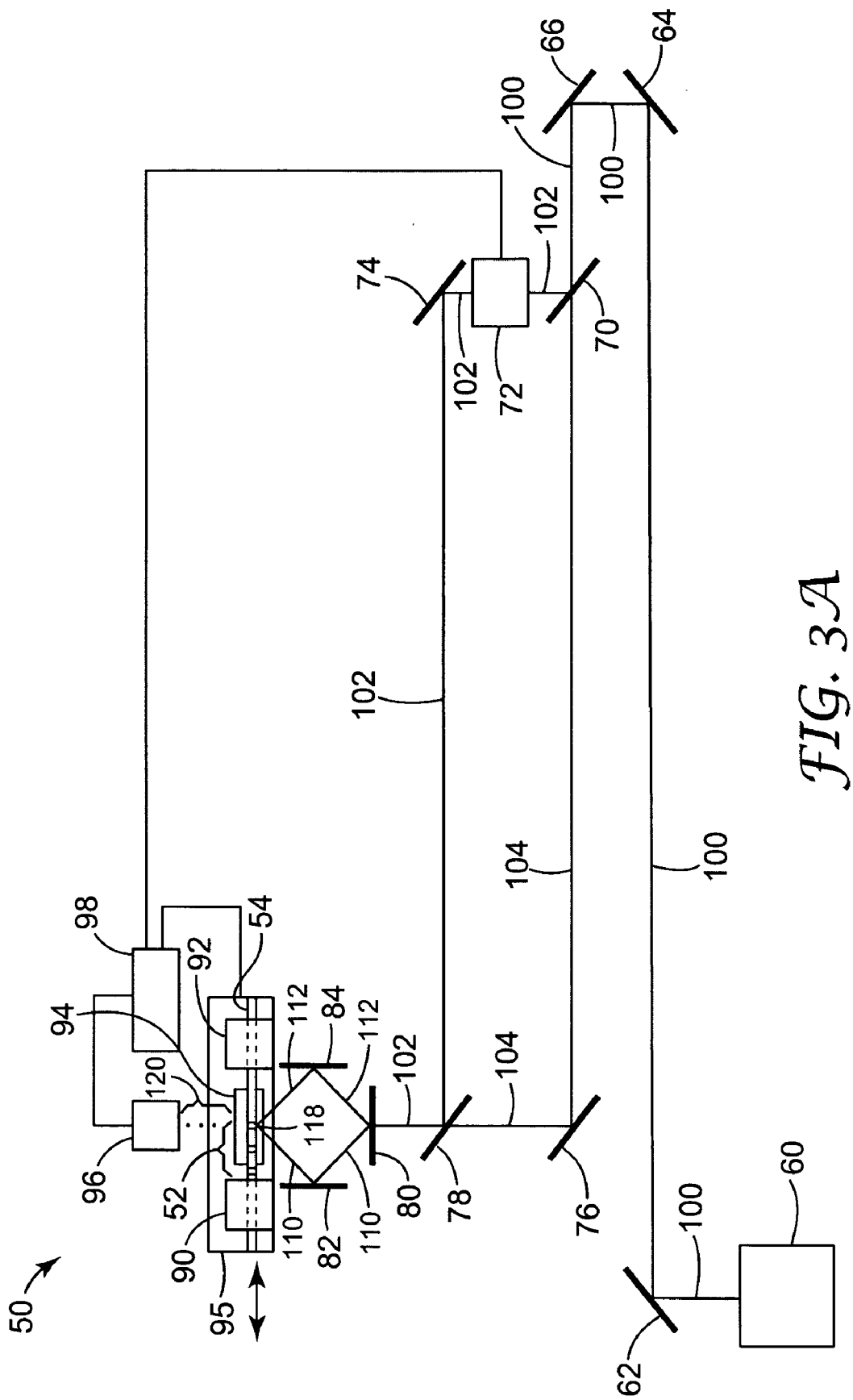
FIG. 3A is a top view of a system for the fabrication of structures in an optical substrate according to an embodiment of the present invention.

FIGS. 3A and 3B are top and perspective views of system 50 for the fabrication of structure 52 in optical substrate 54 according to an embodiment of the present invention. System 50 includes light source 60, a periscope including reflectors 62, 64, and 66, pickoff reflector 70, optical modulator 72, beam steering reflectors 74, 76, and 78, beam splitter 80, reflectors 82 and 84, optical substrate mounts 90 and 92, beam combiner 94, stage 95, detector 96, and controller 98. Optical substrate mounts 90 and 92 and beam combiner 94 are attached to stage 95. Optical substrate 54 is held in position by optical substrate mounts 90 and 92. Detector 96, which is positioned relative to beam combiner 94, is electrically connected to controller 98, and controller 98 is electrically connected to optical modulator 72 and stage 95.

Light source 60, which is preferably a source of actinic radiation such as a laser, produces light beam 100. Light beam 100 is reflected by reflectors 62, 64, and 66, respectively, toward pickoff reflector 70. In one embodiment, reflectors 62 and 64 are active beam steering mirrors that are electromechanically controlled to facilitate active stabilization of light beam 100. This stabilization assures that light beam 100 impinges on pickoff reflector 70 at the desired point and angle. Pickoff reflector 70 reflects a portion of light beam 100 as write input beam 102 and passes a portion of light beam 100 as reference input beam 104. Pickoff reflector 70 is angled such that write input beam 102 is reflected at an angle substantially orthogonal to reference input beam 104.

Write input beam 102 is directed to optical modulator 72 by pickoff reflector 70. In one embodiment, optical modulator 72 is an acousto-optic modulator. Optical modulator 72 is used to alternately turn write input beam 102 on to expose optical substrate 54 and turn write input beam 102 off between exposures. This modulation of write input beam 102 forms a periodic or aperiodic concatenated structure 52. The formation of structure 52 is described in more detail herein. The modulated write input beam 102 is then provided to reflector 74, which subsequently directs write input beam 102 toward reflector 78. Reflector 78 then directs write input beam 102 to beam splitter 80.

Reference input beam 104 is passed through pickoff reflector 70 to reflector 76. Reflector 76 is positioned such that reference input beam 104 is then directed toward beam splitter 80 under reflector 78. When reference input beam 104 reaches beam splitter 80, reference input beam 104 is vertically displaced from write input beam 102 in substantially the same plane as write input beam 102, as shown in FIG. 3B. It should be noted that the optical components that ultimately provide write input beam 102 and reference input beam 104 to beam splitter 80 in substantially the same plane are merely exemplary. Any optical element capable of receiving a light beam and outputting two input beams in substantially the same plane at beam splitter 80 may be substituted for those shown and described heretofore without departing from the spirit and scope of the present invention.

Beam splitter 80 splits write input beam 102 into two writing beams, first write beam 110 and second write beam 112. Beam splitter 80 also splits reference input beam 104 into two reference beams, first reference beam 114 and second reference beam 116. In one embodiment, beam splitter 80 is a phase mask that splits the input beams into two diffraction orders, +1 and −1, with an equal power level. Thus, write input beam 102 is split such that half of write input beam 102 is transmitted from the phase mask as first write beam 110 and half of write input beam 102 is transmitted from the phase mask as second write beam 112. Similarly, reference input beam 104 is split such that half of reference input beam 104 is transmitted from the phase mask as first reference beam 114 and half of reference input beam 104 is transmitted from the phase mask as second reference beam 116. Other ratios of transmitted light are possible as design requirements dictate. In an alternative embodiment, beam splitter 80 is a 50/50 beam splitter that splits each input beam equally.

First write beam 110 and first reference beam 114 are directed by reflector 82 toward optical substrate 54 and beam combiner 94, respectively. Similarly, second write beam 112 and second reference beam 116 are directed by reflector 84 toward optical substrate 54 and beam combiner 94, respectively. Beam combiner 94 may be, for example, a phase mask, glass wedge, a beam splitting cube, and so on. In one embodiment, reflectors 82 and 84 have flat surfaces of incidence. In another embodiment, reflectors 82 and 84 have parabolic surfaces of incidence. The angle of incidence of first write beam 110 and second write beam 112 on optical substrate 54 is based on the point and angle of incidence of first write beam 110 on reflector 82 and of second write beam 112 on reflector 84. First write beam 110 and second write beam 112 are reflected toward optical substrate 54 at an inter-beam half angle, O. First write beam 110 and second write beam 112 intersect at intersection location 118 and interfere with each other at optical substrate 54. The exposure produces a permanent increase in the refractive index of optical substrate 54, creating structure 52 (commonly referred to as a grating in an optical fiber core) according to the exposure pattern. The period of a structure formed is described by Equation 1.

To form structure 52 in optical substrate 54, optical substrate 54 must be moved relative to intersection location 118 of first write beam 110 and second write beam 112. Optical substrate mounts 90 and 92 hold optical substrate 54 and are attached to stage 95. Stage 95 moves laterally as shown to move optical substrate 54 relative to intersection location 118. As optical substrate 54 is moved relative to intersection location 118, optical modulator 72 alternately turns write input beam 102 on to expose optical substrate 54 and turns write input beam 102 off between exposures. This modulation of write input beam 102 forms a periodic or aperiodic concatenated structure 52. The spacing between the individual exposures of structure 52 is based upon the frequency of modulation of write input beam 102 and of the speed of translation of stage 95.

The translation and positioning of optical substrate 54 (and stage 95) must be precisely controlled during the fabrication of structure 52. To achieve this, beam combiner 94 is provided on stage 95 at intersection location 119 of first reference beam 114 and second reference beam 116. In one embodiment, beam combiner 94 is a phase mask. Intersection location 119 is vertically displaced from and in the same plane as the intersection location of first write beam 110 and second write beam 112. Thus, as optical substrate 54 is translated relative to intersection location 118 of first write beam 110 and second write beam 112, beam combiner 94 is translated relative to intersection location 119 of first reference beam 114 and second reference beam 116.

When first reference beam 114 and second reference beam 116 intersect at intersection location 119 at beam combiner 94, they duplicate the interference pattern generated by first write beam 110 and second write beam 112 at intersection location 118 at optical substrate 54. Beam combiner 94 recombines reference beams 114 and 116 into a recombined reference beam or encoded beam. The recombined reference beam includes fringes 120 having a fringe pattern that is oriented perpendicular to the propagation direction of the recombined reference beam. The fringe pattern is substantially maintained as the recombined reference beam propagates toward detector 96.

Detector 96 is positioned relative to beam combiner 94 such that fringes 120 are received by slit 122 in detector 96. An intensity detector located behind slit 122 monitors the intensity of fringes 120 of the recombined reference beam. The intensity of fringes 120 varies with the translation of beam combiner 94. When a phase mask is employed for beam combiner 94, the intensity of fringes 120 in the recombined reference beam oscillate at a rate twice that of the time taken to translate the phase mask by one phase mask spacing ($\Lambda$).

Figure 4:
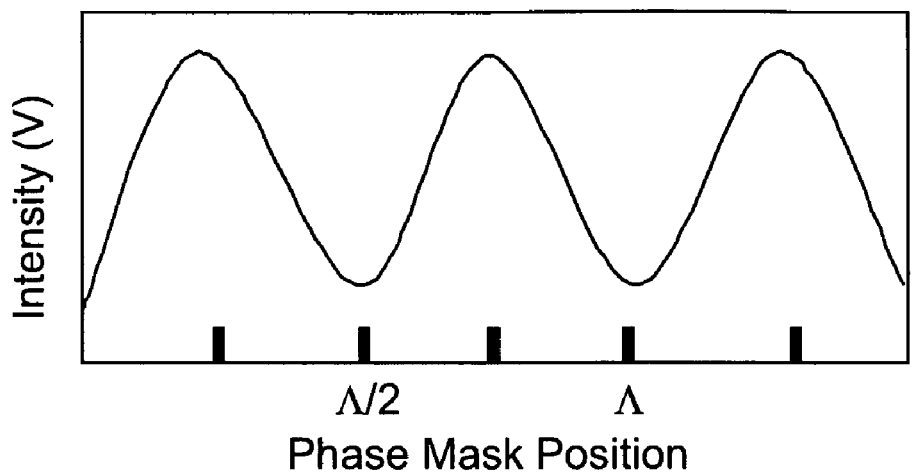
FIG. 4 is a graph showing the intensity of fringes produced by the beam combiner of the system of FIGS. 3A and 3B as a function of beam combiner position.

FIG. 4 is a graph showing the intensity of fringes 120 produced by the phase mask as a function of phase mask position. Since beam combiner 94 is mounted to stage 95 and is thus translated at the same rate as optical substrate 54, position information about optical substrate 54 can be determined by measuring the intensity of fringes 120 as they pass through slit 122. In one embodiment, a photodiode is used to measure the intensity of fringes 120.

The intensity measurement of fringes 120 is provided to controller 98. Controller 98 then calculates the phase of the recombined reference beam based on the intensity of fringes 120. The phase of the recombined reference beam is used by controller 98 to determine the position and direction of motion of optical substrate 54 relative to intersection location 118. When controller 98 determines the position and direction of motion of optical substrate 54, controller 98 adjusts the position and direction of stage 95 as necessary to assure correct fabrication of structure 52. Because phase masks have very good spacing accuracy between phase mask fringes (typically ±1 picometer), sub-nanometer resolutions for the position of optical substrate 54 are achievable.

Figure 5:
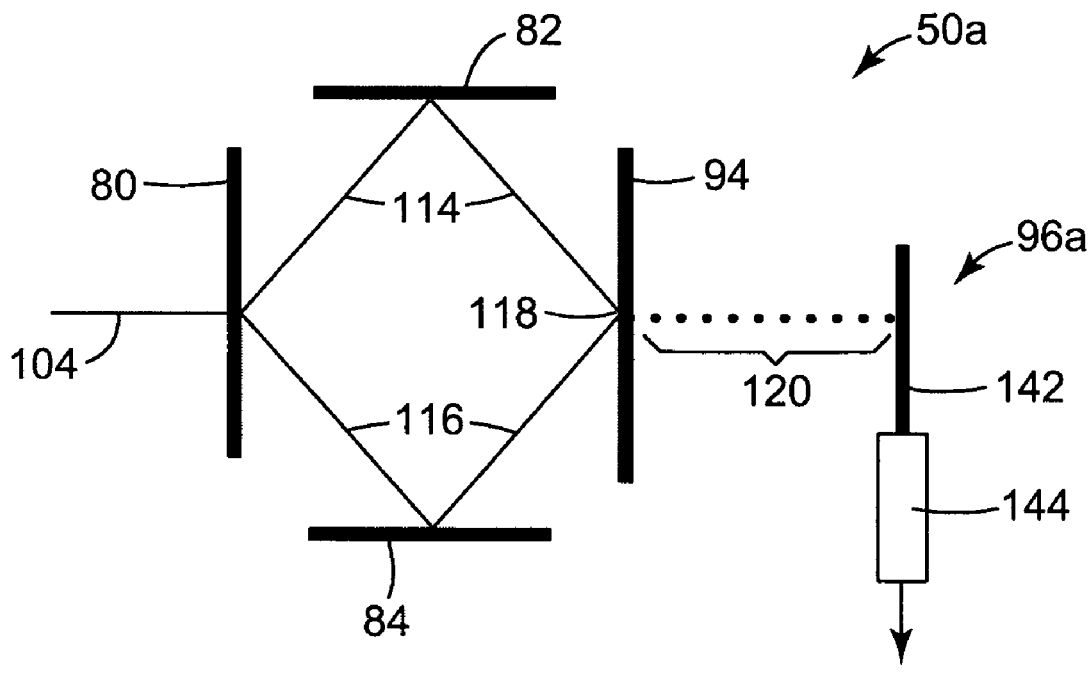
FIG. 5 is a top view of another embodiment of a detector for determining position information about the optical substrate in the system shown in FIGS. 3A and 3B.

FIG. 5 is a top view of a portion of system 50a including detector 96a according to another embodiment of the present invention. Detector 96a includes optical fiber 142 and photo-multiplier tube (PMT) 144. Also shown in FIG. 5 are beam splitter 80, reflectors 82 and 84, and beam combiner 94. Beam splitter 80 splits reference input beam 104 into two reference beams, first reference beam 114 and second reference beam 116. First reference beam 114 is directed by reflector 82 toward beam combiner 94 and second reference beam 116 is directed by reflector 84 toward beam combiner 94. When first reference beam 114 and second reference beam 116 intersect at beam combiner 94, they duplicate the interference pattern generated by first write beam 110 and second write beam 112 at optical substrate 54. Beam combiner 94 recombines reference beams 114 and 116 into a recombined reference beam or encoded beam. The recombined reference beam includes fringes 120 having a fringe pattern that is oriented perpendicular to the propagation direction of the recombined reference beam. The fringe pattern is substantially maintained as the recombined reference beam propagates toward detector 96a.

Detector 96a is positioned relative to beam combiner 94 such that fringes 120 are received by optical fiber 142 of detector 96a. When optical fiber 142 is in the presence of ultraviolet light and a fringe 120 reaches optical fiber 142, optical fiber 142 fluoresces. In one embodiment, optical fiber 142 is doped with a dopant such as germanium or a rare-earth dopant such as thulium to facilitate fluorescence in the presence of ultraviolet light. The intensity of fringes 120 varies with the translation of beam combiner 94. When a phase mask is employed for beam combiner 94, the intensity of fringes 120 in the recombined reference beam oscillate at a rate twice that of the time taken to translate the phase mask by one phase mask spacing ($\Lambda$), as shown in FIG. 4. Since beam combiner 94 is mounted to stage 95 and is thus translated at the same rate as optical substrate 54, position information about optical substrate 54 can be determined by measuring the intensity of fringes 120 as they fluoresce in optical fiber 142.

PMT 144 is optically coupled to the core of optical fiber 142 and is shielded from stray light to sense the intensity of fluorescence in optical fiber 142. The intensity measurement of fringes 120 is provided to controller 98. Controller 98 then calculates the phase of the recombined reference beam based on the intensity of fringes 120. The phase of the recombined reference beam is used by controller 98 to estimate the position and motion of optical substrate 54 relative to the intersection location of write beams 110 and 112. When controller 98 determines the position and direction of motion of optical substrate 54, controller 98 adjusts the position and direction of stage 95 as necessary to assure correct fabrication of structure 52.

Figure 6:
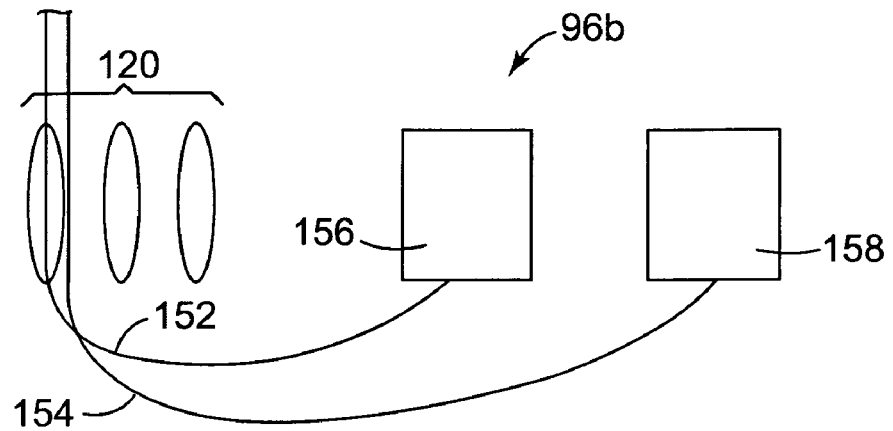
FIG. 6 shows a further embodiment of a detector for determining position information about the optical substrate in the system shown in FIGS. 3A and 3B.

FIG. 6 shows detector 96b according to another embodiment of the present invention. Detector 96b includes first optical fiber 152, second optical fiber 154, first PMT 156, and second PMT 158. Also shown in FIG. 6 are fringes 120 from the recombined reference beam after passing through beam combiner 94. Detector 96b is positioned relative to beam combiner 94 such that signals from beam combiner 94 are received by optical fibers 152 and 154 of detector 96b. In one embodiment, beam combiner 94 is a phase mask and optical fibers 152 and 154 are placed such that the signal from each fiber is delayed by an amount of time corresponding to the translation time of stage 95 by one quarter of a phase mask period ($\Lambda/4$). When optical fibers 152 and 154 are in the presence of ultraviolet light and a fringe 120 reaches optical fibers 152 and 154, optical fibers 152 and 154 fluoresce. In one embodiment, optical fibers 152 and 154 are doped with a dopant such as germanium or a rare-earth dopant such as thulium to facilitate fluorescence in the presence of ultraviolet light. The intensity of fringes 120 varies with the translation of beam combiner 94. When a phase mask is employed for beam combiner 94, the intensity of fringes 120 in the recombined reference beam oscillate at a rate twice that of the time taken to translate the phase mask by one phase mask spacing ($\Lambda$), as shown in FIG. 4. Since beam combiner 94 is mounted to stage 95 and is thus translated at the same rate as optical substrate 54, position information about optical substrate 54 can be determined by measuring the intensity of fringes 120 as they fluoresce in optical fibers 152 and 154.

PMT 156 is optically coupled to the core of first optical fiber 152 and is shielded from stray light to sense the intensity of fluorescing in first optical fiber 152. PMT 158 is optically coupled to the core of second optical fiber 154 and is shielded from stray light to sense the intensity of fluorescence in second optical fiber 154. The intensity measurement of fringes 120 is provided to controller 98. Due to the positioning of first optical fiber 152 with respect to second optical fiber 154, the signal sensed by PMT 156 has a phase that is 90° shifted from the signal sensed by PMT 158. After normalization of the intensity signals sensed by PMT 156 and PMT 158, a sine and a cosine term are obtained. In particular, the normalized intensity signal from PMT 156 is $$S_1 = I \sin\frac{\pi x}{\Lambda}, \quad \text{(Eq. 2)}$$

and the normalized intensity signal from PMT 158 is $$S_2 = I \cos\frac{\pi x}{\Lambda},\qquad \text{(Eq. 3)}$$

where I is the intensity of the recombined reference beam, Λ is the spacing of the phase mask used for beam combiner 94, and x is the current position of optical substrate 54. Controller 98 then determines the phase of the recombined reference beam based on the intensity of fringes 120. The phase of the recombined reference beam is used by controller 98 to determine the position and direction of motion of optical substrate 54 relative to the intersection location of write beams 110 and 112. When controller 98 determines the position and direction of motion of optical substrate 54, controller 98 adjusts the position and direction of stage 95 as necessary to assure correct fabrication of structure 52.

System 50 (and alternative embodiments thereof) provides advantages over conventional systems for the fabrication of structures in an optical substrate. For example, an advantage of controlling the positioning and translation of optical substrate 54 using reference beams 114 and 116 and beam combiner 94 is that writing beams 110 and 112 and reference beams 114 and 116 share similar propagation paths through the same optical elements (i.e., beam splitter 80, reflectors 82 and 84, etc.). As a result, the majority of perturbations common in a manufacturing environment that might affect the writing interference pattern also affect the reference interference pattern. These perturbations can then be detected and corrected to assure proper positioning of optical substrate 54 relative to the writing interference pattern. Another advantage is the close proximity of the beam combiner to the writing interference pattern. Some conventional optical fabrication systems employ a beam combiner that is located away from the optical substrate, such as at the base of the stage. By placing beam combiner 94 close to optical substrate 54 as in system 50, the position of optical substrate 54 can be measured with significantly more accuracy than in conventional systems.

Modulation and Writing

To fabricate structure 52 in optical substrate 54, write beams 110 and 112 must be alternately turned on to expose optical substrate 54 and turned off between exposures. Optical modulator 72, which is controlled by controller 98, modulates write input beam 102 to properly register successive exposures to form a periodic or aperiodic concatenated structure in optical substrate 54, such as structure 52. In order to produce structure 52, the modulation of write input beam 102 must be accurately controlled. To do this, position information about optical substrate 54 is determined from fringes 120, and controller 98 produces a signal that is used to control optical modulator 72 based on the position information about optical substrate.

Figure 7:
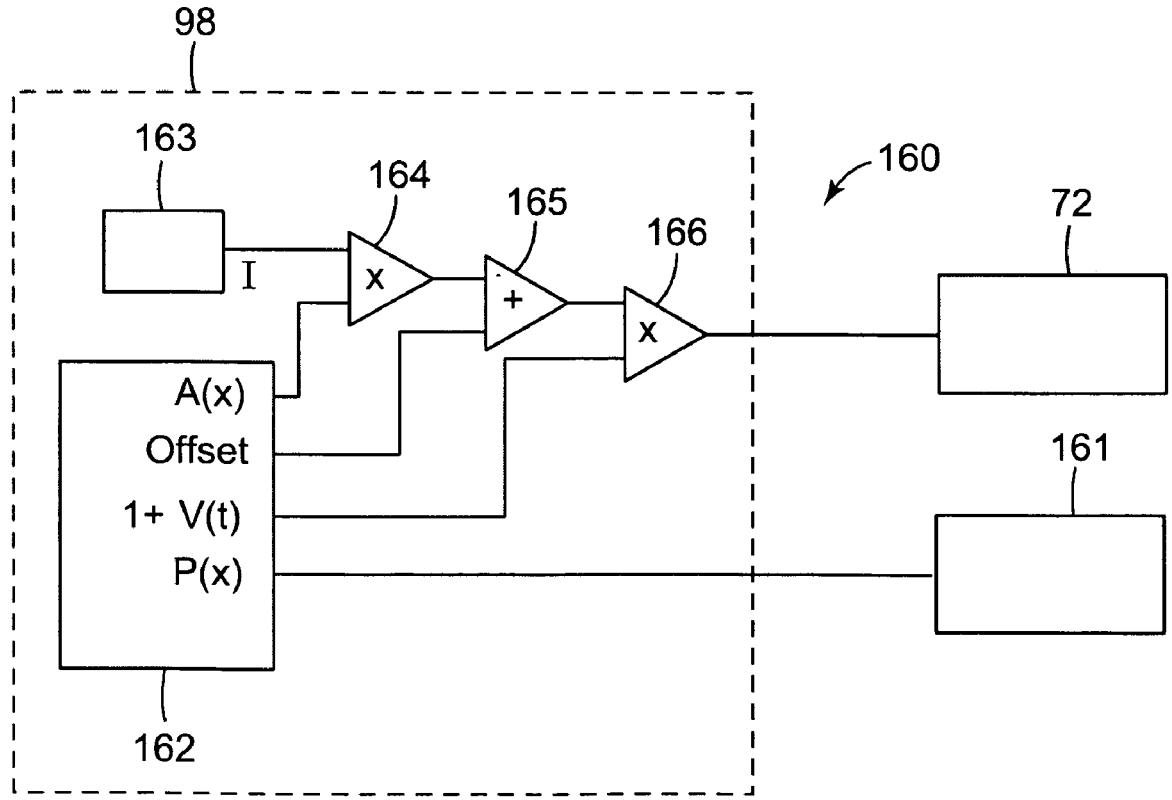
FIG. 7 is a schematic view of an analog optical modulator control system for controlling an optical modulator.

FIG. 7 is a schematic view of analog optical modulator control system 160 for controlling modulation of optical modulator 72 according to an embodiment of the present invention. Optical modulator control system 160 includes optical modulator detector block 72, controller 98, and beam combiner piezoelectric drive circuit 161. Controller 98 includes processor 162, detector block 163, multiplier 164, adder 165, and multiplier 166.

Processor 162 provides inputs to multiplier 164, adder 165, multiplier 166, and beam combiner piezoelectric drive circuit 161. In particular, processor 162 provides an apodization function signal A(x) to multiplier 164, a DC offset signal to adder 165, a DC term plus a modulated interference term, 1+V(t), to multiplier 166, and a beam combiner translation stage control signal P(x) (described in more detail herein) to beam combiner piezoelectric drive circuit 161. Detector block 163, which is representative of any of the fringe detectors heretofore described (e.g., detector 96 in FIGS. 3A and 3B, detector 96a in FIG. 5, and detector 96b in FIG. 6), provides an input to multiplier 164. The output of multiplier 164 provides an input to adder 165, and the output of adder 165 provides an input to multiplier 166. The output of multiplier 166 provides an input to optical modulator 72.

Detector block 163 provides a signal to multiplier 164 based on the intensity of fringes 120. For detector 96 (FIGS. 3A and 3B) and detector 96a (FIG. 5), the intensity measurement signal (I) is provided directly to multiplier 164. For detector 96b (FIG. 6), the intensity signal is determined from Equations 2 and 3 above, wherein the intensity I is $$I = \frac{S_1}{\sqrt{S_1^2 + S_2^2}}\qquad \text{(Eq. 4)}$$

The intensity signal from detector block 163 is then multiplied by an apodization function, A(x), which in one embodiment is a slowly varying envelope function. The apodization function provides the upper and lower bound for the refractive index modulation of exposures in optical substrate 54. In one embodiment, the apodization function is a uniform, Gaussian, or sinc apodization function. A DC offset is then added to the output of multiplier 164 by adder 165. The DC offset shifts the apodization function such that the bottom of the envelope of the apodization function corresponds to the original refractive index of optical fiber 54. After the DC offset, the resulting signal is provided to multiplier 166 to be multiplied by the desired index modulation in optical substrate 54. In one embodiment, the index modulation is a DC term plus a modulated interference term (i.e., 1+V(t)). The output of multiplier 166 is the signal that drives optical modulator 72.

In system 50, the alignment of reflectors 82 and 84 and optical substrate 54, and the wavelength of light beam 100 determines the resonant wavelength of structure 52 (see Equation 1). The resonant wavelength of structure 52 can be shifted (within a couple of nanometers) without significant degradation to the strength of structure 52. One way to produce this shift is to translate optical substrate 54 at a different velocity than beam combiner 94 during fabrication of structure 52. In order to do this, the beam combiner may be mounted on a separate piezoelectric translation stage.

Figure 8A:
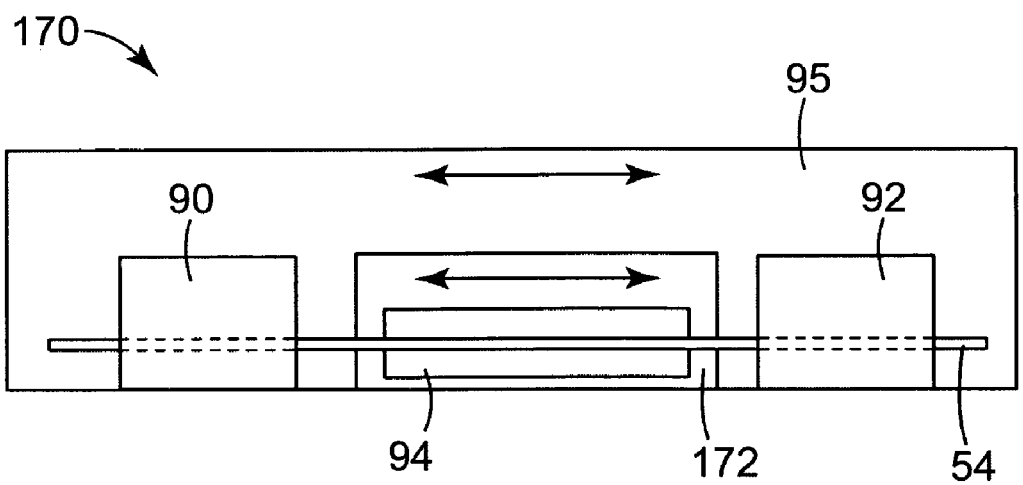
FIG. 8A is a top view of a linear stage assembly for facilitating relative movement between the optical substrate and the beam combiner.
Figure 8B:
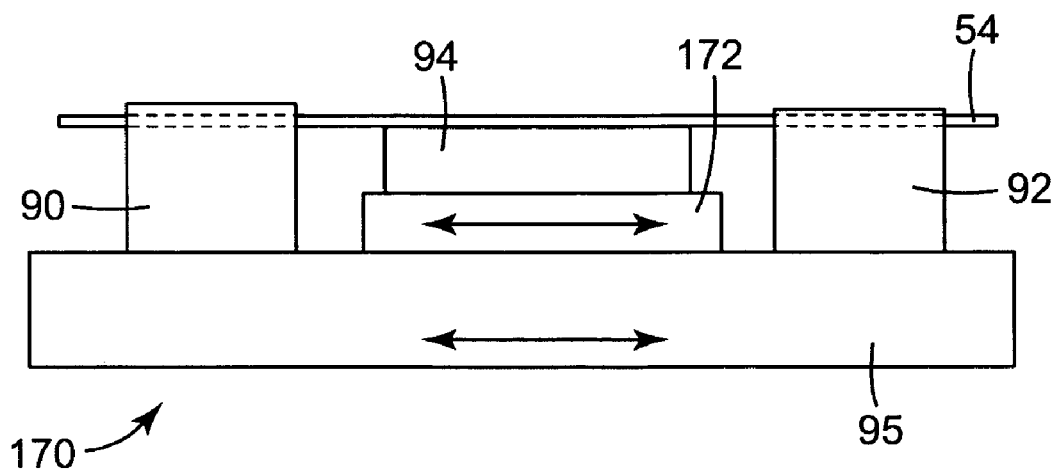
FIG. 8B is a side view of the linear stage assembly shown in FIG. 8A.

FIG. 8A is a top view and FIG. 8B is a side view of linear stage assembly 170 for facilitating relative movement between optical substrate 54 and the beam combiner 94. Linear stage assembly 170 includes optical substrate mounts 90 and 92, beam combiner 94, and stage 95. Additionally, linear stage assembly includes beam combiner translation stage 172 mounted on stage 95. Beam combiner translation stage 172 has beam combiner 94 mounted thereon. In one embodiment, beam combiner translation stage 172 is a piezoelectric stage. With beam combiner 94 mounted on beam combiner translation stage 172, a precisely controlled relative motion can occur between optical substrate 54 and beam combiner 94. That is, when stage 95 moves optical substrate 54 relative to the intersection location of write beams 110 and 112, beam combiner translation stage 172 can move beam combiner 94 at a different velocity relative to optical substrate 54. With this relative motion, the modulation of fringes 120 detected and processed by system 50 is altered, and a shift in the resonant wavelength of structure 52 occurs.

Linear stage assembly 170 can also produce a chirped or position-dependent period in structure 52. To produce a chirped structure, a well-controlled acceleration is maintained between optical substrate 54 and beam combiner 94. For example, a linear chirp is achieved by maintaining a constant acceleration between optical substrate 54 and beam combiner 94 during fabrication of structure 52. For both resonant wavelength shift and chirping, controller 98 provides piezoelectric drive circuit 161 (FIG. 7) with a beam combiner translation stage control signal, P(x), to control movement of beam combiner translation stage 172. The value of P(x) is dependent on the relative positioning between optical substrate 54 and interference fringes at intersection location 118.

Figure 9:
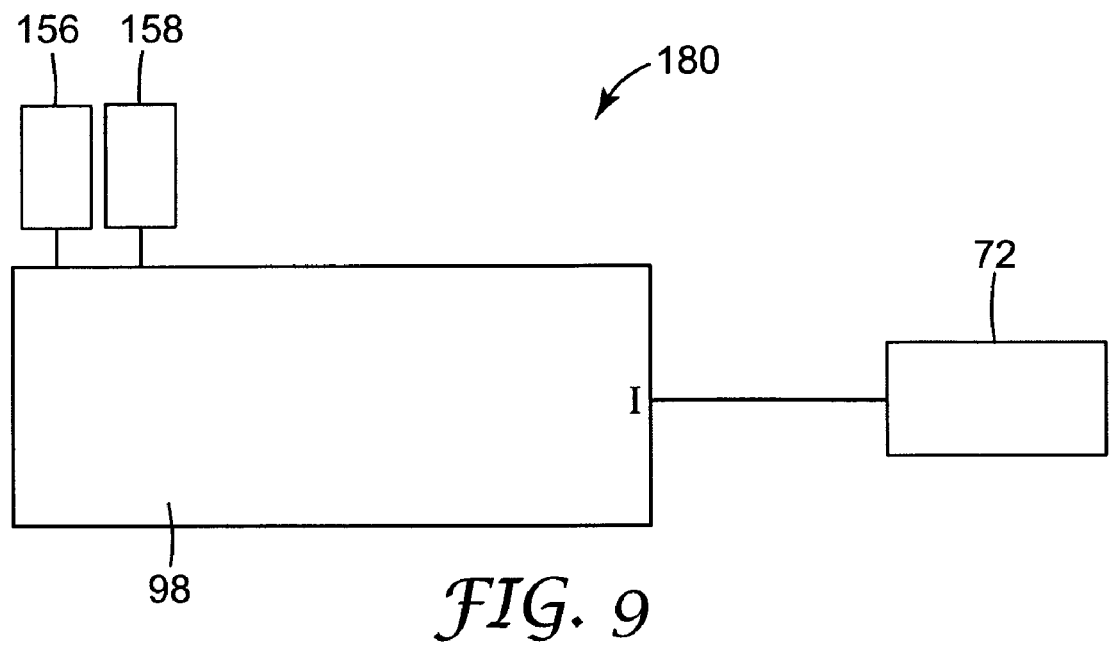
FIG. 9 is a schematic view of a digital optical modulator control system for controlling an optical modulator.

The analog system for controlling optical modulator 72 shown in FIG. 7 may also be implemented digitally. FIG. 9 is a schematic view of digital optical modulator control system 180 for controlling modulation of optical modulator 72 according to an embodiment of the present invention. In optical modulator control system 180, controller 98 receives sine and cosine intensity terms from PMT 156 and PMT 158 of detector 96b (FIG. 6). Alternatively, the intensity signal could be provided by detector 96 (FIGS. 3A and 3B) or detector 96a (FIG. 5). Controller 98 digitizes the intensity signals from PMT 156 and PMT 158 and determines position information about optical substrate 54. Controller 98 then provides a signal to modulate optical modulator 72. For example, controller 98 could modulate optical modulator 72 by the function:

$$I = 0.5 + 0.5 \sin\frac{2\pi x(t)}{\Lambda_s}, \quad \text{(Eq. 5)}$$

where x(t) is the current position of optical substrate 54 as a function of time and $\Lambda_s$ is the desired period of structure 52. The function shown in Equation 5 represents a uniform structure where the refractive index modulation is bounded by a constant-valued envelope.

If desired, an apodization function, such as a uniform, Gaussian, or sinc apodization can be introduced into the modulation function. In one embodiment, the apodization function is a slowly varying envelope function that provides the upper and lower bound for the refractive index modulation of exposures in optical substrate 54. For example, apodization, A(x), is implemented by varying the coefficient of the second term of Equation 5. The new modulation function for optical modulator 72 with the desired apodization at any given position is:

$$I = 0.5 + A(x)\sin\frac{2\pi x(t)}{\Lambda_s}. \quad \text{(Eq. 6)}$$

Additionally, a resonant wavelength shift or chirp can be implemented in this embodiment using linear stage assembly 170 (FIGS. 8A and 8B) to produce a relative motion between optical substrate 54 and beam combiner 94. A chirp can also be produced in structure 52 by varying the period of structure 52 as a function of position of optical substrate 54 during the writing process. In the example above, the modulation function for optical modulator 72 including the apodization function and chirp is:

$$I = 0.5 + A(x)\sin\frac{2\pi x(t)}{\Lambda_s(x)}, \quad \text{(Eq. 7)}$$

where $\Lambda_s(x)$ is the desired period of structure 52 as a function of the position of optical substrate 54.

As discussed above, optical substrate 54 is translated at a different velocity than beam combiner 94 during fabrication of structure 52 to produce a shift in the resonant wavelength of structure 52. That is, when each fringe 120 is shifted, an overlapping of successive exposures of structure 52 may occur. This results in constructive and destructive interference effects that cause the resonant wavelength of structure 52 to also shift. A drawback of this shift in the resonant wavelength of structure 52 is a decrease in the amplitude modulation or strength of structure 52. This decrease in the strength of structure 52 is referred to as detuning.

The impact of detuning is based on the size of light beam 100. As light beam 100 gets larger, the penalty of detuning (i.e., the decrease in the strength of structure 52) increases significantly. This is because as the size of light beam 100 increases, the number of fringes written per exposure also increases. As more fringes are written per exposure, a greater area of washout occurs due to destructive interference caused by the detuning shift.

Figure 10:
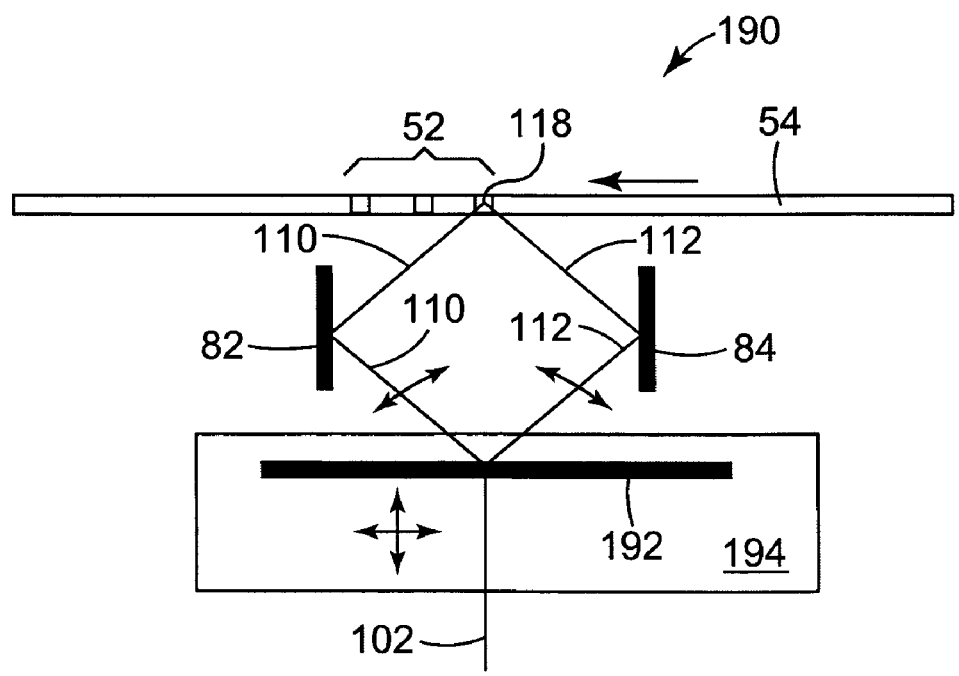
FIG. 10 is a top view of a tunable interferometer for preventing detuning due to a shift in the center wavelength of the optical structure.

FIG. 10 is a top view of tunable interferometer 190 for preventing detuning due to a shift in the resonant wavelength of structure 52 in optical substrate 54 according to an embodiment of the present invention. Tunable interferometer 190 includes reflectors 82 and 84, chirped phase mask 192, and chirped phase mask stage 194. Chirped phase mask 192 is mounted on chirped phase mask stage 194.

Chirped phase mask 192 replaces beam splitter 80 of system 50 to facilitate changing the period at intersection location 118 of write beams 110 and 112 during the fabrication of structure 52. Chirped phase mask 192 is a phase mask that has a period that changes as a function of the position of the phase mask relative to write input beam 102. Chirped phase mask stage 194 is capable of moving chirped phase mask 192 both parallel to and transverse to write input beam 102. The translation of chirped phase mask 192 relative to write input beam 102 shifts the point of incidence of first write beam 110 on reflector 82 and of second write beam 112 on reflector 84. However, intersection location 118 must remain fixed on optical substrate 54 to produce structure 52. Thus, chirped phase mask 192 is moved proportionally both parallel and transverse to write input beam 102 based on the chirp of chirped phase mask 192 to maintain intersection location 196 on optical substrate 54.

When chirped phase mask stage 194 is translated, a change in the angle of intersection of write beams 110 and 112 at intersection location 118 occurs. Pursuant to the Bragg equation (Equation 1), this changes the periodicity at interference pattern 118, and thus of structure 52 written to optical substrate 54. Chirped phase mask 192 may be moved to predetermined positions to create a structure 52 having a specific periodicity. Alternatively, multiple structures 52 with different periods may be multiplexed at the same physical location in optical substrate 54 to reflect multiple wavelengths by moving chirped phase mask 192 relative to write input beam 102 while optical substrate 54 remains stationary. By modulating the period of interference pattern 118 (thereby adjusting the resonant wavelength of structure 52) in this manner, a larger range of structure periods may be fabricated without significant detuning.

Fast/Slow Component Velocity Correction

In systems employing a rotary stage to move the optical substrate at a constant speed relative to the writing interference pattern, the inertia of the rotary stage is used to maintain velocity uniformity (see, e.g., U.S. Pat. No. 5,912, 999, entitled "Method for Fabrication of In-Line Optical Waveguide Index Grating of Any Length," which is hereby incorporated by reference). Linear stages do not have the inertia to maintain constant motion and are more susceptible to outside perturbations due to the close proximity of the stage to other components of the system. These perturbations can come from a variety of sources, such as high frequency components in the system. In addition to mechanical limitations, the lack of response speed (bandwidth) of the linear stage limits the ability to removes these perturbations. Furthermore, it is desirable to maintain velocity uniformity to minimize velocity errors that result in positional errors between the multiple exposures in a structure.

In one embodiment of the present invention combining beam combiner 94 with a correction mechanism, the velocity control of a conventional system including a rotary stage can be implemented with stage 95. In order to accomplish this, reflector 82 or 84 is mounted on a piezoelectric drive element in an embodiment of the present invention. The piezoelectric drive element is a fast component with high bandwidth and high resolution, but a limited range of motion (i.e., limited to tens of microns of total travel), while the linear stage is a slow component but has a large range of motion. Due to the speed of motion of the piezoelectric drive, the piezoelectric drive element can quickly compensate for velocity or positional errors in optical substrate 54 caused by stage 95. Thus, in this embodiment, as position and direction of motion information about optical substrate 54 are determined by controller 98 (from fringes 120), controller 98 not only adjusts stage 95 to compensate for any velocity errors, but also enables the piezoelectric drive element to compensate for these errors. Additionally, velocity errors or positional errors in optical substrate 54 caused by stage 95 may be corrected by adjusting the phase or frequency of the write beams.

Figure 11:
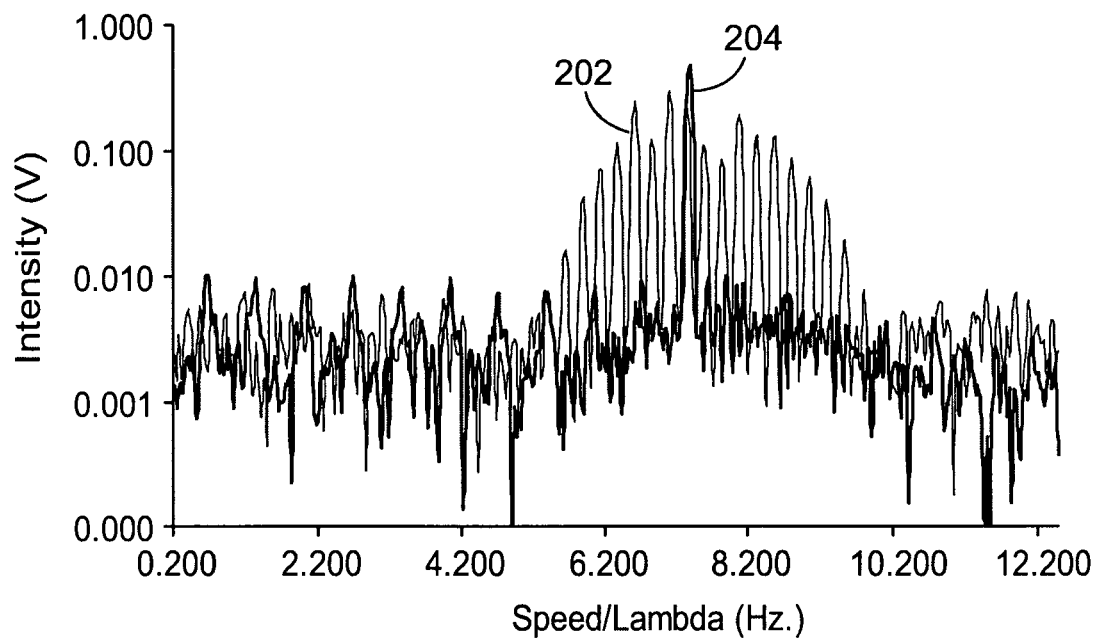
FIG. 11 is a graph showing speed uniformity of a system according to the present invention having a linear stage alone to control movement of the optical substrate and a linear stage including fast/slow component velocity correction components to control movement of the optical substrate.

FIG. 11 is graph showing the frequency response of the signal obtained from a detector when the linear stage is moving. For an ideal uniform motion, a single peak is expected at a frequency equal to the ratio of the linear velocity of the optical substrate divided by half the period of the pattern generated by the intersection of the two reference beams. Plot 202 shows the speed uniformity of a system including a linear stage alone to move the optical substrate. Plot 204 shows the speed uniformity of system 50 in a system employing stage 95 to move optical substrate 54 and a piezoelectric drive element to control motion of reflector 82 or 84 to compensate for velocity or positional errors caused by stage 95. As can be seen, the use of a linear stage alone (plot 202) produces many frequency components, which translates to poor speed uniformity. As a result, good phase agreement between successive exposures of the writing interference pattern is difficult, thus producing a very weak structure or no structure in optical substrate 54. On the other hand, when a piezoelectric drive element is incorporated to control motion of reflector 82 or 84 to compensate for velocity or positional errors caused by stage 95, only a single frequency component is produced (plot 204), which translates to good speed uniformity.

In addition to improving the speed uniformity of system 50, the piezoelectric drive element that moves reflector 82 or 84 also permits the optional elimination of optical modulator 72. Since the piezoelectric drive element is capable of very rapid motion, the reflector attached to the piezoelectric drive element can move the writing interference pattern to the next proper location on optical substrate 54 without significant washout of the modulated refractive index of the exposure. Furthermore, while optical substrate 54 is moved, the piezoelectric drive element can move to keep the writing interference pattern locked onto a fixed location on optical substrate 54. By increasing the exposure time at the fixed location on optical substrate 54, the amplitude of the modulated refractive index in structure 52 increases. Also, the ability to rapidly position each exposure on optical substrate 54 allows for a reduction of the DC or average exposure time (averaged over a period of structure 52). With a reduced DC or average exposure time, the change in the refractive index in optical substrate 54 is used more efficiently, which results in improved coupling strength in structure 52. If DC exposure is necessary, such as to implement apodization, stage 95 and the piezoelectric drive element can be controlled by controller 98 to provide a mixture of constant velocity and discrete motion of optical fiber 54. By adjusting the duration of the DC exposure, nearly any apodization can be achieved.

Two-Dimensional Structures

System 50 and its various alternative embodiments heretofore described have been described with regard to the fabrication of a structure in an optical substrate by translating the optical substrate in one dimension relative to an interference pattern. Additionally, the use of a beam combiner in conjunction with the fabrication system may also be used to fabricate two-dimensional periodic and aperiodic structures, such as wire grid polarizers, beam combiners, antireflection moth eye patterns, planar waveguide gratings, photonic crystal devices, and the like. To do this, the optical substrate can be translated in two dimensions relative to the intersection location of write beams 110 and 112. In order to obtain position information about the optical substrate as it is scanned relative to the intersection location of write beams 110 and 112, the beam combiner can be scanned relative to the intersection location of reference beams 114 and 116.

Figure 12:
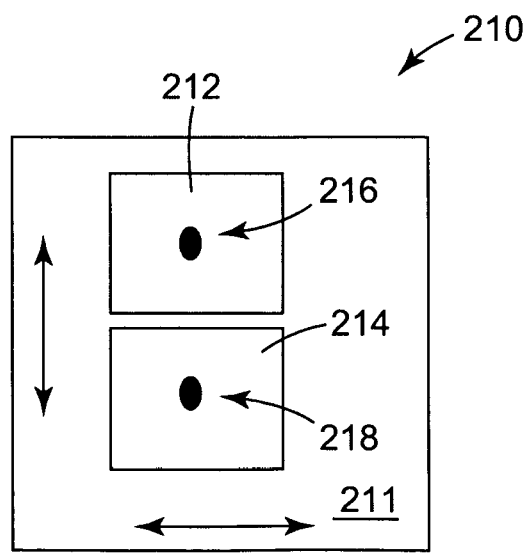
FIG. 12 is a plan view of a positioning stage for fabricating structures in a two-dimensional substrate according to the present invention.

FIG. 12 is a plan view of translation system 210 for use in conjunction with system 50 for fabricating structures in two-dimensional substrate 212. Translation system 210 includes positioning stage 211, two-dimensional substrate 212 and beam combiner 214. Two-dimensional substrate 212 and beam combiner 214 are attached to positioning stage 211. Positioning stage 211 moves two-dimensional substrate 212 in two dimensions relative to intersection location 216 of write beams 110 and 112. Similarly, positioning stage 211 moves beam combiner 214 in two dimensions relative to intersection location 218 of reference beams 114 and 116. In this embodiment, beam combiner 214 can have dimensions substantially similar to the dimensions of two-dimensional substrate 212 to assure that intersection location 218 is received by beam combiner 214 as structures are fabricated to the edges of two-dimensional substrate 212.

The translation and positioning of two-dimensional optical substrate 212 (and positional stage 211) can be precisely controlled during the fabrication of structures in two-dimensional optical substrate 212. The approach to controlling movement of positional stage 211 in two dimensions with beam combiner 214 is similar to the approach to controlling movement of stage 95 in one dimension as was described with regard to FIGS. 3A and 3B. For example, when first reference beam 114 and second reference beam 116 intersect at intersection location 218 at beam combiner 214, they duplicate the interference pattern generated by first write beam 110 and second write beam 112 at intersection location 216 at two-dimensional optical substrate 212. Beam combiner 214 recombines reference beams 114 and 116 into a recombined reference beam or encoded beam. The recombined reference beam includes fringes 120 having a fringe pattern that is perpendicular to the propagation direction of the recombined reference beam. The fringe pattern is substantially maintained as the recombined reference beam propagates toward a detector (e.g., detector 96 in FIGS. 3A and 3B, detector 96a in FIG. 5, and detector 96b in FIG. 6).

The detector is positioned relative to beam combiner 214 (as shown, for example, in FIGS. 3A and 3B) to receive the fringes and monitor the intensity of the fringes of the recombined reference beam. The intensity of the fringes varies with the translation of beam combiner 214. The intensity measurement of the fringes is then provided to a controller. The controller calculates the phase of the recombined reference beam based on the intensity of the fringes. The phase of the recombined reference beam is used by the controller to determine the position and direction of motion of two-dimensional optical substrate 212 relative to intersection location 216 of write beams 110 and 112. When the controller determines the position and direction of motion of two-dimensional optical substrate 212, the controller adjusts the position and direction of positional stage 211 as necessary to assure correct fabrication of the desired structure in two-dimensional optical substrate 212.

FIG. 13A is a plan view of an alternative translation system 220 for use in conjunction with system 50 for fabricating structures in two-dimensional substrate 212. Translation system 220 includes positioning stage 221, two-dimensional substrate 212 and beam combiner 224. Two-dimensional substrate 212 and beam combiner 224 are attached to positioning stage 221. Positioning stage 221 moves two-dimensional substrate 212 in one dimension relative to intersection location 216 of write beams 110 and 112, as shown in FIG. 13A. Similarly, positioning stage 221 moves beam combiner 224 in one dimension relative to intersection location 218 of reference beams 114 and 116. In this embodiment, intersection location 216 of write beams 110 and 112 is scanned along two-dimensional optical substrate 212 in the dimension transverse to the dimension of movement of positioning stage 221 to fabricate structures in two-dimensional optical substrate 212. In this embodiment, beam combiner 224 need only have dimensions substantially similar to the dimensions of two-dimensional substrate 212 in one dimension (the dimension of movement of positioning stage 221) to assure that intersection location 218 is received by beam combiner 224 when structures are fabricated to the edges of two-dimensional substrate 212.

FIG. 13B shows one approach to scanning intersection location 216 along two-dimensional optical substrate 212 in the dimension transverse to the dimension of movement of positioning stage 221. FIG. 13B shows write input beam 102 being redirected to pass through beam splitter 80 to be split into write beams 110 and 112, and redirected by reflectors 82 and 84 to intersect at two-dimensional optical substrate 212 at intersection location 216. Translation system 220 translates two-dimensional optical substrate 212 relative to intersection location 216 as shown. To scan intersection location 216 in a direction transverse to the direction of motion of translation system 220, piezoelectrically driven reflectors 230 and 232 are provided. Piezoelectrically driven reflectors 230 and 232 are moved as necessary to redirect write input beam 102 to meet beam splitter 80 at a different location. As a result, write beams 110 and 112 are reflected by reflectors 82 and 84 and intersect at a different location on two-dimensional optical substrate 212.

The translation and positioning of two-dimensional optical substrate 212 (and positional stage 221) can be precisely controlled during the fabrication of structures in optical substrate 212. The approach to controlling movement of positional stage 221 in two dimensions with beam combiner 224 is similar to the approach to controlling movement of stage 95 in one dimension as was described with regard to FIGS. 3A and 3B. For example, when first reference beam 114 and second reference beam 116 intersect at intersection location 218 at beam combiner 224, they duplicate the interference pattern generated by first write beam 110 and second write beam 112 at intersection location 218 at two-dimensional optical substrate 212. Beam combiner 224 recombines reference beams 114 and 116 into a recombined reference beam or encoded beam. The recombined reference beam includes fringes 120 having a fringe pattern that is oriented perpendicular to the propagation direction of the recombined reference beam. The fringe pattern is substantially maintained as the recombined reference beam propagates toward detector 96. In this embodiment, write input beam 102 is directed to piezoelectrically driven reflectors 230 and 232, while reference input beam 104 is not. Since reference input beam 104 is not reflected by piezoelectrically driven reflectors 230 and 232, it remains stationary and gives appropriate position information about two-dimensional optical substrate 212 when write input beam 102 is scanned by piezoelectrically driven reflectors 230 and 232.

Detector 96 is positioned relative to beam combiner 224 to receive fringes 120 and monitor the intensity of the fringes 120 of the recombined reference beam. Detector 96a (FIG. 5) or detector 96b (FIG. 6) may alternatively be employed instead of detector 96. The intensity of fringes 120 varies with the translation of beam combiner 224. The intensity measurement of fringes 224 is then provided to a controller. The controller then calculates the phase of the recombined reference beam based on the intensity of the fringes. The phase of the recombined reference beam is used by the controller to determine the position and direction of motion of two-dimensional optical substrate 212 relative to intersection location 216 of write beams 110 and 112. When the controller determines the position and direction of motion of two-dimensional optical substrate 212, the controller adjusts the position and direction of positional stage 221 as necessary to assure correct fabrication of the desired structure in two-dimensional optical substrate 212.

EXAMPLE

The configuration described above with respect to FIGS. 13A and 13B was assembled to fabricate a grating pattern in UV5 (0.03 through 1.5) Positive Deep UV Photoresist, available from Shipley Company, Marlborough, Mass. An ultraviolet laser beam having a diameter of 1 mm was provided as the input beam to system 50. Translation stage 221 was moved relative to intersection location 216 at a rate of 1 mm/sec. Piezoelectrically driven reflectors 230 and 232 were employed to scan intersection location 216 along the photoresist in a direction transverse to the direction of translation of translation stage 221. Intersection location 216 was scanned at a rate of 100 scans per second (100 Hz). The substrate was then rotated 90°, and the fabrication procedure using translation stage 221 and piezoelectrically driven reflectors 230 and 232 was repeated. After this second exposure, the photoresist was baked at 130° C. for 90 seconds. Subsequently, the unwanted photoresist was removed with Microposit MF CD-26 Developer, available from Shipley Company, Marlborough, Mass. The resulting structure, shown in the photograph in FIG. 14, was a grating pattern formed in photoresist having a period of 520 nm. Depending on the end-use product configuration and application, further processing can be performed on the grating pattern to, for example, pattern the photoresist or add material (such as by a plating or deposition method) in the areas without photoresist.

In summary, conventional systems for the fabrication of structures in an optical substrate address errors due to fluctuations in the velocity of the stage carrying the optical substrate. However, other perturbations common in a manufacturing environment, such as interference fringe drift or movement, vibrations of optical mounts, wavelength fluctuations, fluctuations of the write beam position, and so on, cause equivalent position or velocity errors but may remain undetected and uncorrected. The present invention is a system and method for fabricating structures in an optical substrate that addresses these and other issues. An optical element produces first and second write beams that intersect at a first intersection location at the optical substrate. The first intersection location includes a fringe pattern produced by the first and second write beams. The optical element also produces first and second reference beams that intersect and are recombined at a second intersection location in substantially the same plane as the first intersection location. A controller then controls relative positioning between the optical substrate and the fringe pattern based on a signal derived from the recombined first and second reference beams. In one embodiment, the controller includes a beam combiner positioned at the second intersection location for recombining the first and second reference beams into an encoded beam. The controller additionally includes a detector to produce a detector signal based on the encoded beam. The controller also includes a processor to determine position information about the optical substrate based on the detector signal. The controller further includes a device for positioning the optical substrate based on the position information about the optical substrate.

Although the present invention has been described with reference to preferred embodiments, workers skilled in the art will recognize that changes may be made in form and detail without departing from the spirit and scope of the invention.

The invention claimed is:

1. A system for fabricating structures in an optical substrate, the system comprising:
    an optical element that produces first and second write beams that intersect at a first intersection location at the optical substrate and first and second reference beams that intersect and are recombined at a second intersection location in substantially the same plane as the first intersection location, the first intersection location including a fringe pattern produced by the first and second write beams; and
    a controller that controls relative positioning between the optical substrate and the fringe pattern based on a signal derived from the recombined first and second reference beams.

2. The system of claim 1, wherein the controller comprises:
    a beam combiner, positioned at the second intersection location, to recombine the first and second reference beams into an encoded beam;
    a detector to produce a detector signal based on the encoded beam;
    a processor to determine position information about the optical substrate based on the detector signal; and
    a translation stage to position the optical substrate based on the position information about the optical substrate.

3. The system of claim 2, wherein the detector comprises:
    a slit for receiving the encoded beam; and
    an intensity detector for determining an intensity of the encoded beam passing through the slit and calculating a phase of the encoded beam based on its intensity.

4. The system of claim 2, wherein the detector comprises:
    a first optical fiber for receiving the encoded beam; and
    a first optical detector optically coupled to the first optical fiber for producing a first signal related to the position of the optical substrate based on the encoded beam.

5. The system of claim 4, wherein the detector further comprises:
    a second optical fiber positioned proximate to the first optical fiber for receiving the encoded beam; and
    a second optical detector optically coupled to the second optical fiber for producing a second signal related to the position of the optical substrate based on the encoded beam.

6. The system of claim 2, wherein the beam combiner comprises a phase mask.

7. The system of claim 2, wherein the translation stage provides relative motion of the optical substrate with respect to the first intersection location and provides relative motion of the beam combiner with respect to the second intersection location.

8. The system of claim 7, wherein the translation stage comprises:
    a linear stage that carries the optical substrate and the beam combiner such that the optical substrate is moved relative to the first intersection location at substantially the same rate as the beam combiner is moved relative to the second intersection location.

9. The system of claim 7, wherein the translation stage comprises:
    a linear stage that carries the optical substrate; and
    a piezoelectric stage that carries the beam combiner to facilitate movement of the beam combiner relative to the optical substrate.

10. The system of claim 1, wherein the optical element comprises:
    a beam splitter to produce the first and second write beams from a first input beam and the first and second reference beams from a second input beam; and
    a reflecting portion to direct the first and second write beams to intersect at the first intersection location and for directing the first and second reference beams to intersect at the second intersection location.

11. The system of claim 10, wherein an angle of intersection of the first and second write beams and an angle of intersection of the first and second reference beams are adjustable by moving the beam splitter relative to the first input beam and the second input beam.

12. The system of claim 11, wherein the beam splitter is a chirped phase mask.

13. The system of claim 10, wherein the reflecting portion comprises first and second reflectors positioned to direct the first and second write beams, respectively, to intersect at the first intersection location and to direct the first and second reference beams, respectively, to intersect at the second intersection location.

14. The system of claim 13, wherein at least one of the first and second reflectors is a moving mirror mounted on a piezoelectric element and controlled by the controller to adjust a position of the fringe pattern with respect to the optical substrate.

15. The system of claim 10, wherein the first input beam is modulated to form a concatenated periodic structure in the optical substrate when the optical substrate is translated relative to the fringe pattern.

16. A method for fabricating structures in an optical substrate, the method comprising:
   producing first and second write beams from a first input beam and first and second reference beams from a second input beam, wherein the first and second input beams originate from a same light source;
   directing the first and second write beams to intersect at a first intersection location at the optical substrate, the first intersection location including a fringe pattern produced by the first and second write beams;
   directing the first and second reference beams to intersect at a second intersection location in substantially the same plane as the first intersection location;
   deriving a reference signal from the first and second reference beams at the second intersection location; and
   adjusting a relative positioning between the optical substrate and the first intersection location based on the reference signal.

17. The method of claim 16, wherein deriving a reference signal from the first and second reference beams at the second intersection location comprises:
   recombining the first and second reference beams into an encoded beam with a beam combiner; and
   determining position information about the optical substrate and the fringe pattern from the encoded beam.

18. The method of claim 17, and further comprising:
   translating the beam combiner across the second intersection location.

19. The method of claim 16, and further comprising:
   translating the optical substrate relative to the fringe pattern; and
   modulating the first input beam to form a concatenated periodic structure in the optical substrate when the optical substrate is translated across the fringe pattern.

20. A system for fabricating structures in an optical substrate, the system comprising:
   an optical assembly to produce a write input beam and a reference input beam from a light beam and to direct the write input beam and the reference input beam along substantially similar propagation paths;
   an interferometer to receive the write input beam and the reference input beam and produce first and second write beams from the write input beam and first and second reference beams from the reference input beam, the first and second write beams intersecting and producing a fringe pattern at a first intersection location at the optical substrate, the first and second reference beams intersecting at a second intersection location in substantially the same plane as the first intersection location;
   a beam combiner positioned at the second intersection location to recombine the first and second reference beams into a recombined beam;
   a detector positioned to receive the recombined beam and determine position information about the optical substrate and the fringe pattern based on the recombined beam; and
   a controller to control relative positioning between the optical substrate and the fringe pattern based on a signal derived from the recombined beam.

* * * * *